May 21, 1957

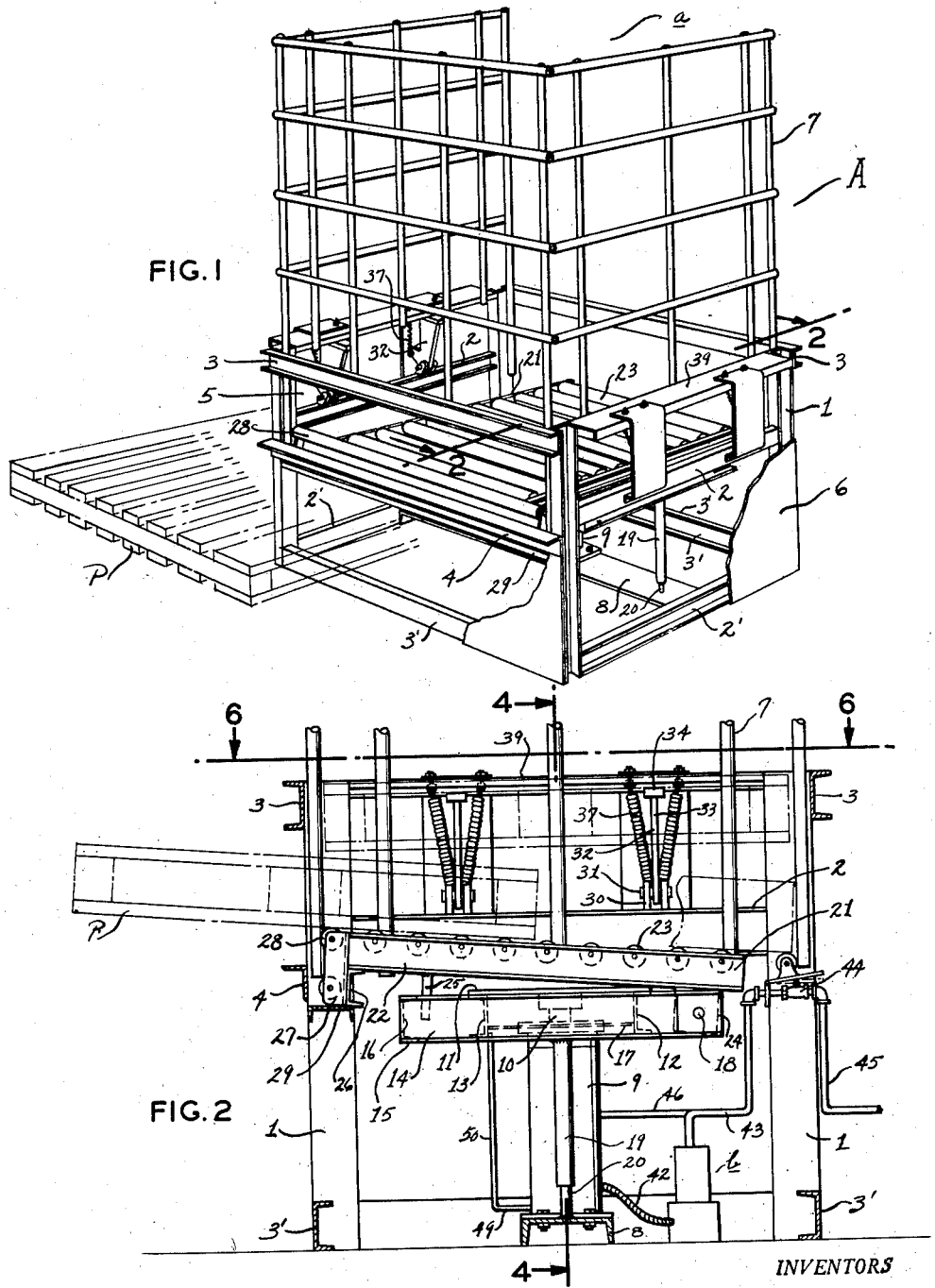

F. W. FENTON ET AL 2,792,950

PALLET STACKING MACHINES

Filed Aug. 16, 1954

INVENTORS
FRANK W. FENTON & HAROLD L. BOCK
BY
Ralph W. Kalish

ATTORNEY

INVENTORS
FRANK W. FENTON & HAROLD L. BOCK
BY Ralph W. Kalish
ATTORNEY

United States Patent Office 2,792,950
Patented May 21, 1957

2,792,950

PALLET STACKING MACHINES

Frank W. Fenton, St. Louis, Mo., and Harold L. Bock, Greenwood, Ind., assignors to Beacon Production Equipment Corporation, Centreville Township, Ill., a corporation of Illinois Application August 16, 1954, Serial No. 449,968

3 Claims. (Cl. 214—6)

This invention relates in general to stackers and, more particularly, to a machine for stacking and storing unloaded pallets.

In the innumerable types of industrial plants utilizing pallets for material handling purposes, the cost of maintenance of the pallets has increasingly become a substantial expense item. Heretofore, there have been no devices conducive to orderly stacking and storing of pallets, but the same have been subject to careless treatment through hand stacking and the consequent removal. Furthermore, in plants having no organized pallet storing area, pallets are customarily roughly used in being thrown into remote, out of the way places on termination of usage, and similarly handled in being collected for ultimate use. It is recognized that, with indiscriminate scattering of pallets about a plant area, valuable production space is uselessly appropriated. Thus, proper pallet storage, wherein pallets are protected against careless handling and damage from trucks and the like, will preserve the pallets with reduction in cost of maintenance thereof, as well as require but minimum plant space.

Therefore, an object of this invention is to provide a machine which is adapted to stack pallets and incorporates a storage portion for receiving the pallets as stacked.

Another object of this invention is to provide a machine for stacking unloaded pallets which is adapted to feed pallets to the bottom of the stack formed by the machine.

Another object of this invention is to provide a pallet stacking machine which may be placed at any desired point within a plant and may be utilized with a conveyor system for readily feeding pallets to the machine for stacking and storing thereof.

A further object of this invention is to provide a pallet stacking and storing machine which is durable and reliable in operation; which is economical in construction; and the use of which will protect pallets against damaging handling with consequent material increase in the lives thereof.

These and other detailed objects are obtained by the structure illustrated in the accompanying drawings (three sheets) in which:

Figure 1 is a perspective view of a pallet stacking machine constructed in accordance with and embodying the present invention.

Figure 2 is a vertical transverse section taken along line 2—2 of Figure 1 showing the carriage in lowered position.

Figure 3:
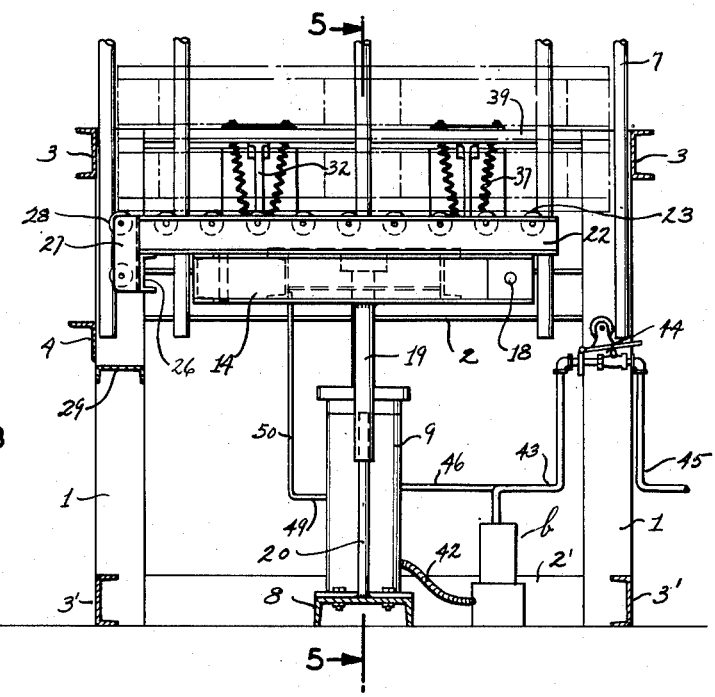
Figure 3 is a vertical transverse section taken substantially on line 2—2 of Figure 1 showing the carriage in fully raised position.

In the accompanying drawing, A designates a pallet stacking machine having a generally rectangular base frame comprised of upright corner members 1, interconnecting upper and lower side members 2, 2', and forward and rear upper and lower transverse members 3, 3', being constructed preferably of channel stock; said upper side members 2 being spaced downwardly from the upper ends of the adjacent corner members. Provided substantially intermediate front upper and lower transverse members 3, 3', is a cross piece 4 for cooperating with member 3 to define therebetween a load opening or inlet 5 extending the width of the base frame. Metallic sheets 6 are secured to the various members of the base frame for enclosing same. Supported on the base frame, and projecting upwardly therefrom, is a three-sided frame 7, which may be of lattice character, being comprised of vertical and horizontal rods, pipes, or other suitable stock, for defining a pallet storage or stacking chamber $a$. It will be noted that frame 7 does not extend along the rear side of machine A which is thus open above the base frame to permit access to the chamber $a$ for pallet withdrawal purposes, as will appear more fully below.

Extending between lower side members 2' and secured at its ends thereto, as by welding, is a narrow base plate 8 centrally upon which is mounted a vertically presented power cylinder 9, as of the pneumatic or hydraulic type, having a piston rod 10 entering same through its upper end or head. Fixedly secured at the upper end of piston rod 10 is a plate 11 rigid on its under surface with a pair of spaced, transversely extending, channel-shaped brace members 12, 13, of the frame of a carriage or elevator 14, having parallel lateral members 15 and a forward end member 16, the latter being parallel with brace members 12, 13. A pair of reinforcement and support plates 17 are provided between brace members 12, 13; being parallel to lateral members 15. Rigid with, and extending between, lateral members 15 adjacent their rearward end is a rod 18.

Secured substantially intermediate each side member 15 and depending vertically from the lower flange thereof is a tubular guide member 19, each for relative telescopic movement with respect to a cooperating guide post 20; said posts 20 being welded at their lower ends to base plate 8 and upstanding therefrom. Thus, carriage 14 may be raised and lowered within the base frame enclosure responsive to action of fluid cylinder 9, as described hereinbefore, with each guide member 19 riding upwardly and downwardly along the related guide post 20 to prevent any inadvertent lateral displacement of carriage 14 during operation.

Disposed for movement by carriage 14 is a conveyor platform 21 comprising channel-shaped side elements 22 within which are journaled the ends of a plurality of horizontally spaced apart rollers 23. Conveyor platform 21 is relatively narrower and of greater length than the frame of carriage 14. Integral with, and depending from, each side element 22 adjacent its rearward end is a lug 24, which may be of channel configuration, apertured for journaling of rod 18, whereby platform 21 is rendered swingable with respect to carriage 14. Projecting downwardly from each side element 22 spacedly from its forward end, is a short guide rod 25 for disposition inwardly of the adjacent side member of carriage 14 to prevent unauthorized lateral displacement of conveyor platform 21.

Secured, as by welding, to the bottom web of side elements 22 at their forward ends is a cross bar 26 which projects at its ends beyond said elements 22. At each end of cross bar 26, and on its forward face, there is suitably mounted a short, vertical journal plate 27 for a pair of horizontally arranged, vertically aligned rollers 28, the upper of which is disposed slightly above rollers 23. Extending across the front portion of the base frame of machine A between front uprights 1 and adjacent the lower edge of cross member 4 is a support bar 29 for receiving cross bar 26 and its associated structure when platform 21 is in lowered position, as shown in Figure 2. With reference now being made to Figure 2, it will be seen that when carriage 14 is in fully lowered position the forward end of conveyor platform 21 will be supported on bar 29 causing platform 21 to incline downwardly and rearwardly from loading opening 5 to provide for gravity impelled movement thereon. As carriage 14 is raised, it will gradually lift conveyor platform 21 from support bar 29 to cause same to be fully carried on carriage 14, as by resting of side elements 22 upon brace members 12, 13, and forward member 16, wherein it will be horizontally disposed as it is carried upwardly of support bar 29 and returned thereto on downward travel of carriage 14. Therefore, as carriage 14 continues downwardly, the forward end of platform 21 will be arrested by support bar 29 causing it to swing relatively to carriage 14 about rod 18, with the degree of swing being determined by the downward limit of travel of carriage 14.

Provided on the upper flange of each side member 2 are preferably two pairs of ears 30 for supporting pin 31 upon which there is mounted for inward and outward swinging movement a vertically presented, plate-like, pallet-support dog 32. Each dog 32 is provided with an upwardly and inwardly inclined inner, cam-forming edge 33 and a relatively widened top portion 34. Proximate their lower ends, each dog 32 includes an outwardly projecting boss 35 apertured for fixedly receiving a pin 36 about each end of which there is engaged the lower end of a coil extension spring 37. At their upper ends, springs 37 are secured to eyelets 38 mounted on the under surface of the web of a channel member 39 extending between, and being welded at its ends to, the adjacent uprights 1 in axial parallel relation to members 2, 2'; said web being horizontally disposed and of greater width for projection beyond the plane of the sides of machine A. Springs 37 of each set diverge upwardly from their lower points of attachment on each dog 32 so as to allow unimpeded swinging of said dogs. Extending upwardly from top portion 34 of each dog 32 at the outer end thereof is an abutment projection 40 disposed between the flanges of members 39 for detent engagement with the inner flange of members 39 to limit the extent of inward swinging of dogs 32. The pivotal mounting of dogs 32 is so related to the center of gravity thereof as to cause dogs 32 to be biased through gravity into inward position wherein abutment 40 is in engagement with the inner flanges of members 39.

Power cylinder 9 may be of any desired type and the elements of the systems for operation of the same may be conventional. However, the timing of operation of cylinder 9 must be closely controlled and for such purpose there may be provided a system comprising a controller such as a pilot-operated valve denoted generally b which is connected to a source of driving fluid, as compressed air, by a pipe 41 and to cylinder 9 through a conduit 42 which serves as the fluid inlet and outlet for said cylinder. By means of piping 43, valve b is connected to a cam-operated switch 44 in communication with a source of fluid through pipe 45. Also, valve b is in communication through a conduit 46 with a limit switch 47 mounted upon a post 48 upstanding from base plate 8. Switch 47 is adapted for actuation by a short, horizontally disposed lug 49 formed at the lower end of a vertical arm 50 depending from and fixed at, its upper end to brace member 13.

It will be noted that cam-operated switch 44 is so disposed as to present its cam element in substantial alignment with rollers 23 of platform 21 when the same is in lowered or pallet-receiving position whereby a pallet moving thereon will engage the cam element to cause opening of switch 44. By this action, fluid will be delivered to valve b to effect opening thereof, permitting driving fluid to be charged to cylinder 9 through conduits 41, 42. Piston 10 will thus be raised causing carriage 14 and platform 21 to be carried upwardly for delivery of pallets to chamber a as described below. Upon arrival of carriage 14 at its uppermost position lug 49 on vertical arm 50 will engage limit switch 47 to actuate valve b for effecting exhaustion of driving fluid from cylinder 9. Thus, with the withdrawal of fluid from cylinder 9 piston 10 will descent through gravity to return carriage 14 and platform 21 to lowered position.

The system hereinabove described is designed primarily for use with compressed air or other gaseous fluid. However, it is obvious that, if desired, cylinder 9 may be of the hydraulic type with appropriate well-known switch members being integrated in a system for effecting operation in the desired manner.

Figure 4:
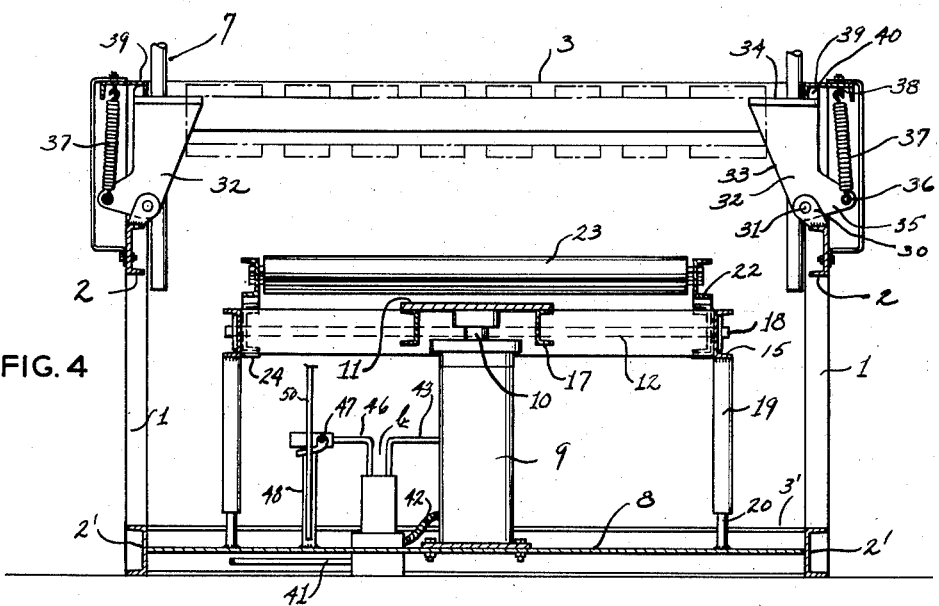
Figure 4 is a vertical transverse section taken on line 4—4 of Figure 2.
Figures 5, 6:
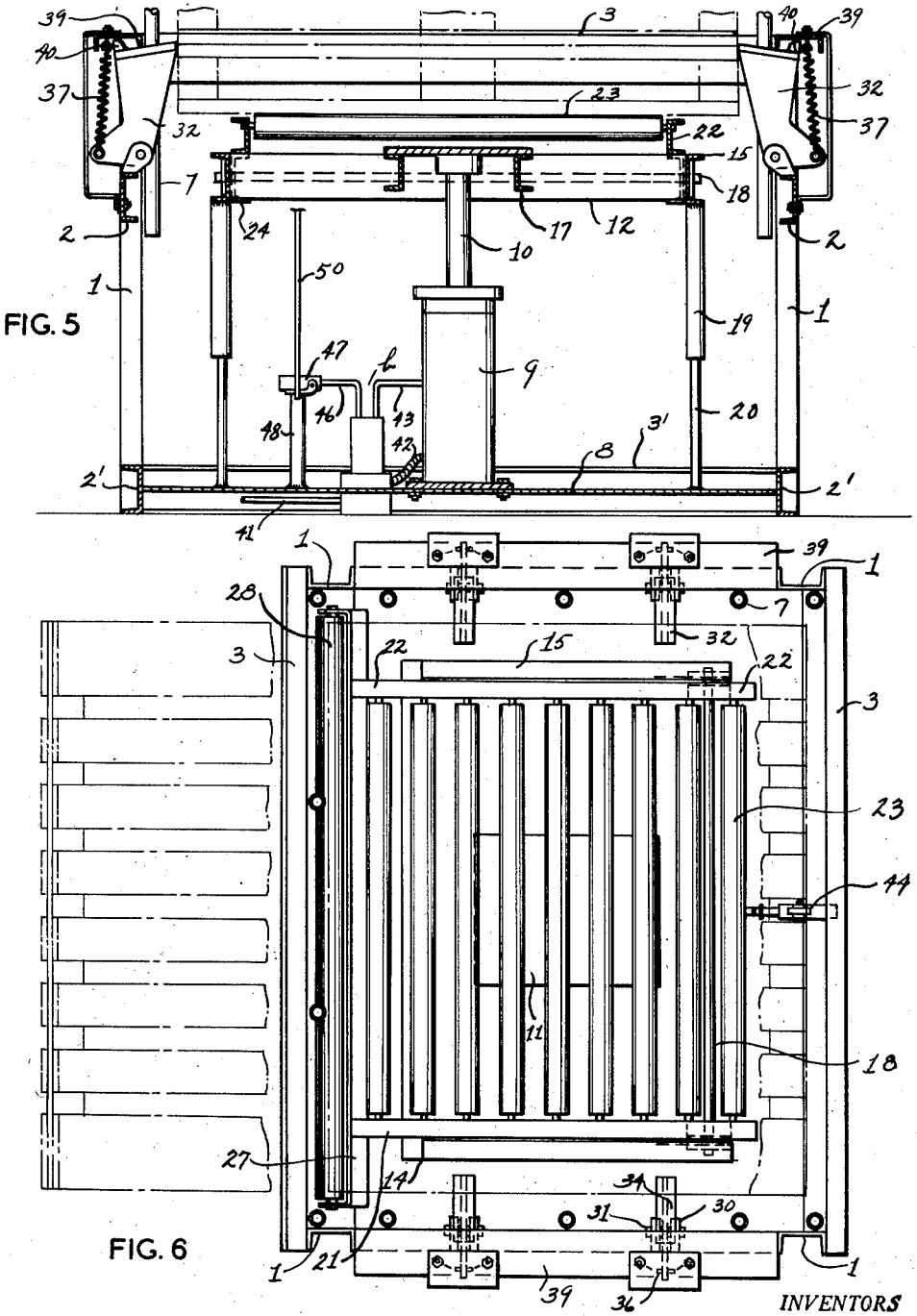
Figure 5 is a vertical transverse section taken on line 5—5 of Figure 3.
Figure 6 is a horizontal transverse section taken on line 6—6 of Figure 2.

The operation of machine A is as follows: With carriage 14 in lowered position, wherein cylinder 9 is exhausted of driving fluid, as shown in Figure 2, platform 21 will be downwardly and rearwardly inclined from loading opening 5 and dogs 32 will be in inward position through gravity, as shown above. A loading pallet, as indicated at P, is fed to machine A through opening 5. Because of the inclination of platform 21, pallet P will slide downwardly and rearwardly over rollers 23 and thence into engagement with the cam element of switch 44. Upon this engagement, switch 44 will be opened to effect actuation of valve b for providing driving fluid to cylinder 9. Thus, piston 10 will be driven upwardly causing elevation of carriage 14, platform 21, and pallet P. As platform 21 assumes a horizontal disposition through elevation by carriage 14, pallet P will be presented in like manner. As pallet P is carried upwardly, the same will engage on its upper edge and side portions the cam-forming edges 33 of dogs 32 and by its continued movement force dogs 32 to swing outwardly about their pivots. Such movement of dogs 32 will place a load upon springs 37 for biasing dogs 32 for return to inwardly swung position. As soon as the upper deck of the pallet being stacked loses engagement with dogs 32, the same will be freed for inward swinging under influence of springs 37 whereupon top portions 34 thereof will be disposed beneath the upper deck of the pallet being stacked for supporting same (Figure 4). The upward travel of carriage 14 is so designed as to permit the upper deck of the pallet being stacked to clear dogs 32 before, or simultaneously with, the actuation of limit switch 47 by lug 49 on arm 50, whereby exhaustion of cylinder 9 is effected for downward return movement of carriage 14 and platform 21.

It will be noted that when dogs 32 are in operative, or inwardly swung position, the same will support the full load of the pallets stacked thereabove. Upon stacking of each subsequent pallet, the load of the pallet stack is supported by cylinder 9 through carriage 14 during the interval of time dogs 32 are in outwardly swung or inoperative position.

The pallets thus stacked within chamber a may be removed at selected intervals and in convenient loads by a fork lift truck through the open rear side of chamber a. Rollers 28 provided at the forward end of platform 21 materially assist in the reception of pallets upon the platform 21 and conduce to the smooth operation of the machine A.

If desired, a conveyor may be used in conjunction with machine A to feed pallets thereto. By such an arrangement, associated conveyors could lead from various points in the plant so that pallets could be readily fed to machine A with minimum effort.

The details of construction can be varied without departing from the spirit of the invention and the exclusive

What we claim and desire to secure by Letters Patent is:

1. A pallet stacking machine comprising a main four-sided frame defining a base portion and an upper pallet-storage chamber, said frame having on one side in its base portion a pallet-feed opening spacedly above the bottom of said base portion, a fluid motor having a piston located in said base portion, an elevator carriage mounted on the upper end of said piston for movement thereby toward and away from said pallet storage chamber, a platform pivotally engaged at its rearward end to the rearward end portion of said elevator carriage, plates secured at opposite sides of the forward end of said platform and extending downwardly below same, a member provided in said main frame proximate the pallet-feed opening for supporting the said plates when said elevator is in lowered position wherein the upper surface of which is substantially aligned with said member whereby said platform will be presented in rearwardly and downwardly inclined position for gravity impelled movement thereacross of a pallet to be stacked and received thereon through said feed opening, a first switch for actuating said fluid motor disposed rearwardly of said platform when in pallet-receiving position for operation by the pallet received thereon whereby upward travel of said elevator carriage is effected, a second switch for effecting return or downward movement of the elevator carriage and located beneath said carriage when the latter is in lowered position, a switch actuating arm secured to, and depending from said elevator carriage for engaging said second switch after said elevator carriage has traveled upwardly a predetermined distance, and spring-biased dog elements provided on the frame in the upper part of the base portion for retentively engaging the pallet carried by the platform when the elevator is substantially at its upper travel limit.

2. A pallet stacking machine comprising a main four-sided frame defining a base portion and an upper pallet-storage chamber, said frame having on one side in its base portion a pallet-feed opening spacedly above the bottom of said base portion, a fluid motor having a piston located in said base portion, an elevator carriage mounted on the upper end of said piston for movement thereby toward and away from said pallet storage chamber, a pallet-receiving platform pivotally engaged in its rearward end portion to the rearward end portion of said elevator carriage, with its forward end portion being free whereby said platform is movable with said elevator carriage, plates secured at opposite sides of the forward end portion of said platform, being axially normal thereto and extending downwardly below the bottom portion thereof, vertically aligned rollers extending transversely between said plates, a cross bar provided in said main frame proximate and below the pallet-feed opening and above the pivot axis of said platform when the elevator carriage is in lowered position for supportingly receiving the lower ends of said plates as the platform is carried downwardly so that further downward travel will cause a pivoting of the platform with respect to the elevator carriage whereby at its lower limit of travel said platform will be presented in downwardly and rearwardly inclined position for gravity impelled movement thereacross of a pallet fed through the opening, a first switch for actuating said fluid motor disposed rearwardly of said platform when in pallet-receiving position for operation by the pallet received thereon whereby upward travel of said elevator carriage is effected, a second switch for effecting return or downward movement of the elevator carriage and located beneath said carriage when the latter is in lowered position, a switch actuating arm secured to, and depending from said elevator carriage for engaging said second switch after said elevator carriage has traveled upwardly a predetermined distance, and spring-biased dog elements provided on the frame in the upper part of the base portion for retentively engaging the pallet carried by the platform when the elevator is substantially at its upper travel limit.

3. A pallet stacking machine comprising a main four-sided frame defining a base portion and an upper pallet-storage chamber, said frame having on one side in its base portion, a pallet-feed opening, a fluid motor having a piston located in said base portion, an elevator carriage mounted on the upper end of said piston for movement thereby toward and away from said pallet storage chamber, a platform carried on said elevator carriage, a first switch for actuating said fluid motor disposed rearwardly of said platform when in pallet-receiving position for operation by the pallet received thereon whereby upward travel of said elevator carriage is effected, a second switch for effecting downward movement of the elevator carriage and located beneath said carriage when the latter is in lowered position, a switch actuating arm secured to, and depending from said elevator carriage for engaging said second switch after said elevator carriage has traveled upwardly a predetermined distance, and means provided on the frame in the upper part of the base portion for retentively engaging the pallet carried by the platform when the elevator is substantially at its upper travel limit.

References Cited in the file of this patent

UNITED STATES PATENTS

| | | |
|---|---|---|
| 1,292,635 | Parker | Jan. 28, 1919 |
| 1,292,636 | Parker | Jan. 28, 1919 |
| 1,549,823 | White | Aug. 18, 1925 |
| 2,220,191 | Whylie | Nov. 5, 1940 |
| 2,313,478 | Neja | Mar. 9, 1943 |
| 2,401,592 | Von Stocker | June 4, 1946 |
| 2,538,734 | Patterson | Jan. 16, 1951 |